United States Patent [19]

Smith et al.

[11] 4,126,023
[45] Nov. 21, 1978

[54] TAMPERPROOF LOCKING AND LATCHING MECHANISM FOR ROTATABLE CONTROLS

[75] Inventors: Michael E. Smith, Hinsdale; Robert G. Brown, Derry, both of N.H.

[73] Assignee: Watts Regulator Co., Lawrence, Mass.

[21] Appl. No.: 787,316

[22] Filed: Apr. 14, 1977

[51] Int. Cl.² ............................................. F16K 35/06
[52] U.S. Cl. ........................................ 70/177; 70/180; 70/212; 137/385; 251/104; 251/110; 251/288
[58] Field of Search ................ 137/384, 385; 251/104, 251/105, 110, 288; 70/175, 176, 177, 180, 212

[56] References Cited

U.S. PATENT DOCUMENTS

| 195,611 | 9/1877 | Jarecki | 70/146 X |
|---|---|---|---|
| 557,943 | 4/1896 | Bayley et al. | 251/110 |
| 834,429 | 10/1906 | Wiggs | 137/385 X |
| 934,099 | 9/1909 | Sheafe | 251/104 |
| 959,090 | 5/1910 | Wickle | 251/104 |
| 3,648,970 | 3/1972 | Hartmann et al. | 137/385 X |
| 3,960,168 | 6/1976 | Plympton | 137/385 |

FOREIGN PATENT DOCUMENTS 254,542  8/1927  Italy ......................................... 251/104

*Primary Examiner*—Gerald A. Michalsky

[57] ABSTRACT

A latching and locking mechanism for a rotatable control of the type having a stem journaled in a body and rotatable about an axis in a boss on the body. The stem has a protuberance for engagement with a handle. The handle comprises a boss-engaging end portion, a stem-engaging portion, a slider-riding portion, and a grip end portion. The slider-riding portion has a slider with a tang extending therefrom and means for securing a lock to restrict movement of the slider. The boss has surfaces located to correspond to predetermined positions of the stem. These surfaces are engageable by the tang which, when so engaged, restrains the handle from rotation and prevents removal of the handle from the stem.

6 Claims, 4 Drawing Figures

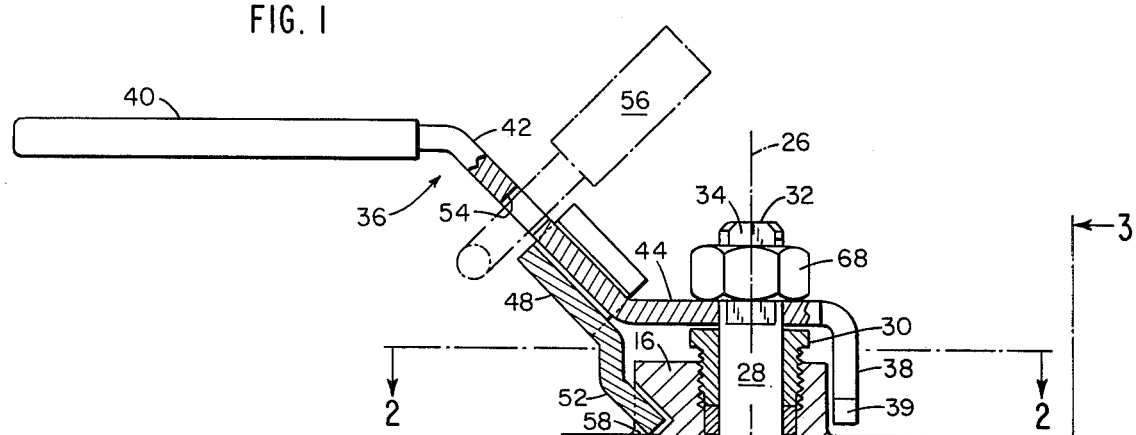
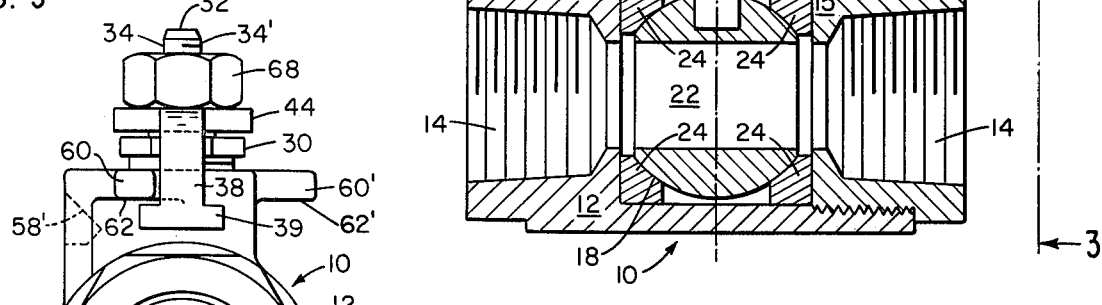
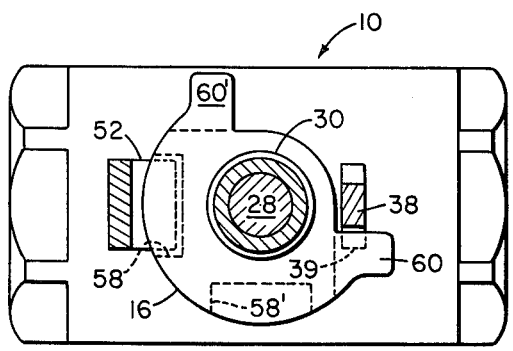
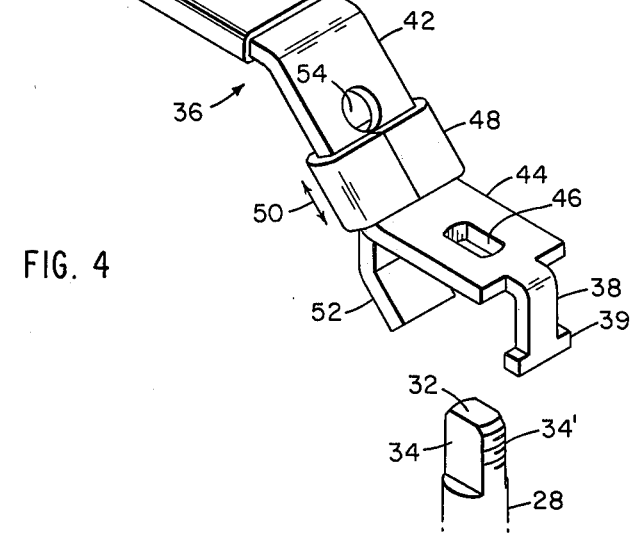

TAMPERPROOF LOCKING AND LATCHING MECHANISM FOR ROTATABLE CONTROLS

BRIEF SUMMARY OF THE INVENTION

This invention relates generally to controls of the type having a rotatable stem projecting from a body. More particularly, it relates to such controls in which the stem positions are determined by elements external to the body. For example, such a control may comprise a valve of the type having a valve element rotatable about the stem axis, such as a ball valve, a butterfly valve or a plug valve.

Valves rotatable through less than a full revolution between open and closed positions are frequently used where rapid, efficient cutoff or flow diversion are required. To furnish an external indication of the flow conditions within the valve or to locate the valve element in a desired flow control position, frequently such valves have been fitted with stops against which a structure on the valve handle abuts when the valve is in a corresponding operative position. Such means are frequently used on valves having no internal stops for the valve element.

Such valves are often used where the disposition of the valve element at a particular time is critical to the proper functioning of the overall fluidic system. When valves of this type are located in areas where there is a significant risk of intentional tampering, or where inadvertent opening, closing, or mispositioning of the valve is a possibility, locking and latching means for use with the valve control is a necessity.

Accordingly, there is a need for control means for rotating an element, which includes a latching feature for ensuring that the element is located in a selected operational position, together with a locking feature for preventing unauthorized tampering therewith.

The present invention provides such a latching and locking mechanism for a rotatable control comprising a body having a boss and a stem rotatably mounted in the boss. The mechanism comprises an elongate handle having a grip end portion and slider-riding and stem-engaging portions. A slider positioned on the slider-riding portion features a tang that extends toward the boss. The boss has recesses having locking surfaces engageable by the tang to restrain the handle from rotation and to prevent removal of the handle axially from the stem when the tang and a locking surface are engaged. The slider-riding portion further comprises means for receiving a lock to secure the slider in a selected locking position.

In preferred embodiments, the slider-riding portion forms an acute angle to the stem axis. The boss has stops spaced apart about the axis for limiting rotation of the handle between a first and a second position, and defines recesses located beneath the stops. For cooperation with this structure, a boss-engaging end portion on the handle is shaped to form an inverted-T which, when positioned in the recess, cooperates with the tang to prevent axial removal of the handle from the stem even when the handle retaining nut is removed. Furthermore, the grip end portion of the handle is designed so that, if subjected to stress while the mechanism is in a locked position, it will deform before the locking structure deforms to failure.

A principal object of the invention is to provide a simple and economical lock mechanism that furnishes significant protection against unauthorized operation of the control with which it is used.

Another object of the invention is to provide a lock mechanism that obstructs any attempt at disassembly or destruction thereof.

Another object of the invention is to provide a latching mechanism for a valve which ensures that the valve will be disposed only in one of its predetermined operating positions.

These and other objects and features of the invention will be apparent from the following description of a preferred embodiment.

BRIEF DESCRIPTION OF THE DRAWING

FIG. 1 is an elevation in section of a valve and a locking mechanism embodying the invention, showing the valve in its open position and the locking mechanism in a locking position.

FIG. 2 is a view in section taken on line 2—2 of FIG. 1.

FIG. 3 is an end elevation taken on line 3—3 of FIG. 1.

FIG. 4 is an exploded perspective view of the handle and stem of the embodiment of FIG. 1.

Corresponding reference numerals in the several figures indicate corresponding parts.

DETAILED DESCRIPTION

Referring to the drawing, FIG. 1 shows a ball valve generally designated at 10 which comprises a body 12 defining a fluid passage 14 and a laterally extending boss 16. A portion of the body 12 is internally threaded to receive an adapter section 15. A rotatable valve element 18 comprises a ball having a hole 22. The ball is mounted on valve seats 24 for rotation about a stem axis 26. A stem 28 is mounted in a stem sleeve 30 in the boss 16 and is operatively engaged by a conventional key and slot for rotation of the valve ball 18. As seen most clearly in FIG. 4, the stem 28 has a protruberance 32 of non-circular cross section, i.e., having two opposed flat surfaces, 34 and 34'. As will be appreciated from FIG. 1, a quarter turn of the valve element 18 about the axis 26 rotates the element 18 between the full-open and closed positions of the valve.

The latching and locking mechanism comprises an elongate handle 36 which has a boss-engaging end portion 38, a slider-riding portion 42, a stem-engaging portion 44, and a grip end portion 40. The boss-engaging end portion has an inverted T-shape as seen in FIGS. 3 and 4, and extends from the stem engaging portion 44 downwardly toward the boss 16. The stem-engaging portion has a slot 46 for receiving the stem protruberance 32. A handle retaining nut 68 holds the handle on the stem.

A slider 48 envelopes the slider-riding portion 42 slideably for reciprocal movement in the directions of arrows 50 as shown in FIG. 4, and has a tang 52 extending toward the boss 16. The slider-riding portion 42 forms an acute angle to the axis 26 and has a hole 54 which comprises means for receiving the shackle of a padlock 56 to secure the slider 48 in a locking position, for example the position illustrated in FIG. 1.

The grip end portion 40 is fabricated from a material of a thickness and structural shape such that upon the application of force when the mechanism is locked, it will deform prior to destruction of the locking structure.

The boss has undercut surfaces forming recesses engageable by the tang 52 of the slider 48. One recess 58' is situated at a first position wherein the valve element 18 closes the passage 14. Another recess 58 is situated at a second position, as illustrated in FIG. 1, wherein the valve element opens the passage. In the illustrated embodiment, the tang receiving recesses 58 and 58' are spaced 90° apart about the axis 26. The recesses are undercut to define locking surfaces that interfit with the tang 52.

Stops 60 and 60' comprise integral lateral extensions from the boss 16 and define undercut recesses 62, 62' therebelow.

In operation, the handle 36 is rotated about the axis 26, thereby rotating the stem 28 and the valve element 18 until a side of the boss-engaging end portion 38 abuts a stop, e.g. the stop 60. One of the two lateral projections 39 forming the T-configuration of the boss engaging end portion is then positioned in a recess 62 as shown in FIG. 3. The slider 48 may then be moved downwardly on the slider-riding portion 42 so that the tang 52 interfits with the tang receiving recess 58. In this position, the valve cannot be inadvertently rotated to another position.

When the padlock 56 is fastened through the hole 54, the valve locking mechanism is secured in its locked position wherein unauthorized tampering with the valve is substantially prevented. The tang and the lateral extension 39 of the boss-engaging end portion 38, when lodged in the respective recesses as described, prevent removal of the handle axially from the stem even if the handle retaining nut 68 is removed. In this position, rotation of the valve element in either direction is prevented by the interior surfaces of the tang receiving recess 58.

Stress exerted on the handle to force the lock mechanism while in a locking position will deform the handle before the stem-engaging end portion 38 or the tang 52 deforms to failure, and attempts to bend the tang out of the recess 58 with a screwdriver or the like are prevented by the close proximity of the valve body 12.

To move the valve element 18 to its closed position, the padlock 56 is removed, the slider 48 is slid upwardly along the slider-riding portion 42, and the handle is rotated in a counter-clockwise direction (as viewed in FIG. 2) until the boss-engaging end portion 38 abuts the stop 60'. Such rotation moves the valve element 18 to its closed position. To lock the valve in this position, the slider and lock are repositioned as described above.

It will be understood that the foregoing description of a ball valve is merely illustrative of the invention. In principle, the invention may be employed on any control device of the type having a rotatable stem, especially where it is desired to control the stem position by means external to the body in which it is journaled, and where it is desired lock the stem in a selected control position in a tamperproof manner. Other valve applications include, for example, plug and butterfly valves. Other non-valve applications include, for example, rheostats, potentiometers, variable capacitors and inductors, control cable operators, and linkage mechanisms or gear trains adapted for coupling to the stem.

Also, it will be apparent that more than two operative positions of the control, represented in this embodiment by the recesses 58 and 58', may be provided for. The number of such recesses and the angular displacements therebetween are a matter of choice in design. Accordingly, the described embodiment is intended to be illustrative and not restrictive, the scope of the invention being defined by the appended claims.

We claim:

1. In a rotatable control device comprising a body having a boss and control means including a stem journaled in the body for rotation about an axis in the boss,
   a handle having a grip end portion and slider-riding and stem-engaging portions, and
   a slider on the slider-riding portion having a tang extending toward the boss, the boss having a surface engageable by the tang in a locking position of the slider to restrain the handle from rotation about said axis, said handle having a boss-engaging end portion extending toward the boss, and said boss having a surface engageable therewith to define a rotational limit position of the handle, said slider being movable to said locking position with the handle located at said limit position, said boss being undercut at said surface to receive said end portion and thereby to prevent removal of said handle axially from said stem while the slider is in said locking position.

2. The combination according to claim 1, in which the handle is adapted for engagement with a lock to prevent movement of the slider from said locking position.

3. The combination according to claim 2, in which the handle has a hole for receiving the shackle of a padlock.

4. The combination according to claim 1, in which the boss has two surfaces mutually spaced about the axis of the stem for abutment by the boss-engaging end portion at corresponding rotational limit positions of the handle.

5. The combination according to claim 1, in which the boss-engaging end portion is T-shaped and said two surfaces of the boss mutually spaced about said axis are undercut to receive said T-shaped end portion and thereby to prevent removal of the handle axially from the stem while the slider is in said locking position.

6. The combination acocrding to claim 1, in which the slider-riding portion extends at an acute angle to the axis of the stem.

* * * * *